United States Patent [19]

Bettiol et al.

[11] 4,279,480
[45] Jul. 21, 1981

[54] OPHTHALMIC LENS HAVING AN ASPHERIC SURFACE

[75] Inventors: Bruno Bettiol, Quincy-Voisins; Christian Harsigny, Yerres; William Lenne, Gagny, all of France

[73] Assignee: Essilor International Cie Generale d'Optique, Creteil, France

[21] Appl. No.: 86,800

[22] Filed: Oct. 22, 1979

[30] Foreign Application Priority Data

Oct. 24, 1978 [FR] France .................................. 78 30152

[51] Int. Cl.³ ........................... G02B 3/04; G02C 7/02
[52] U.S. Cl. ....................................... 351/159; 350/432
[58] Field of Search ................ 350/189, 192; 351/159, 351/167, 168, 169

[56] References Cited

U.S. PATENT DOCUMENTS

| | | | |
|---|---|---|---|
| 2,482,698 | 9/1949 | Tillyer | 351/159 X |
| 3,778,133 | 12/1973 | Tatian | 350/192 X |
| 3,797,922 | 3/1974 | Plummer | 350/189 X |
| 4,181,409 | 1/1980 | Whitney et al. | 351/167 |

*Primary Examiner*—Conrad J. Clark
*Assistant Examiner*—Scott J. Sugarman
*Attorney, Agent, or Firm*—Charles E. Brown

[57] ABSTRACT

An ophthalmic lens is described having a front face which is a surface of revolution and is located entirely in front of the transverse plane tangential to its center. The curve representing the half-meridian of this front face corresponds to the following general formula:

$$x = ay^2 + by^\alpha + cy^\gamma$$

in which the coefficient a is different from zero and negative, at least one of the coefficients b and c is different from zero and positive, $\alpha$ is a real number which is greater than or equal to 3 and less than 4, and $\gamma$ is a real number which is greater than or equal to 4.

5 Claims, 7 Drawing Figures

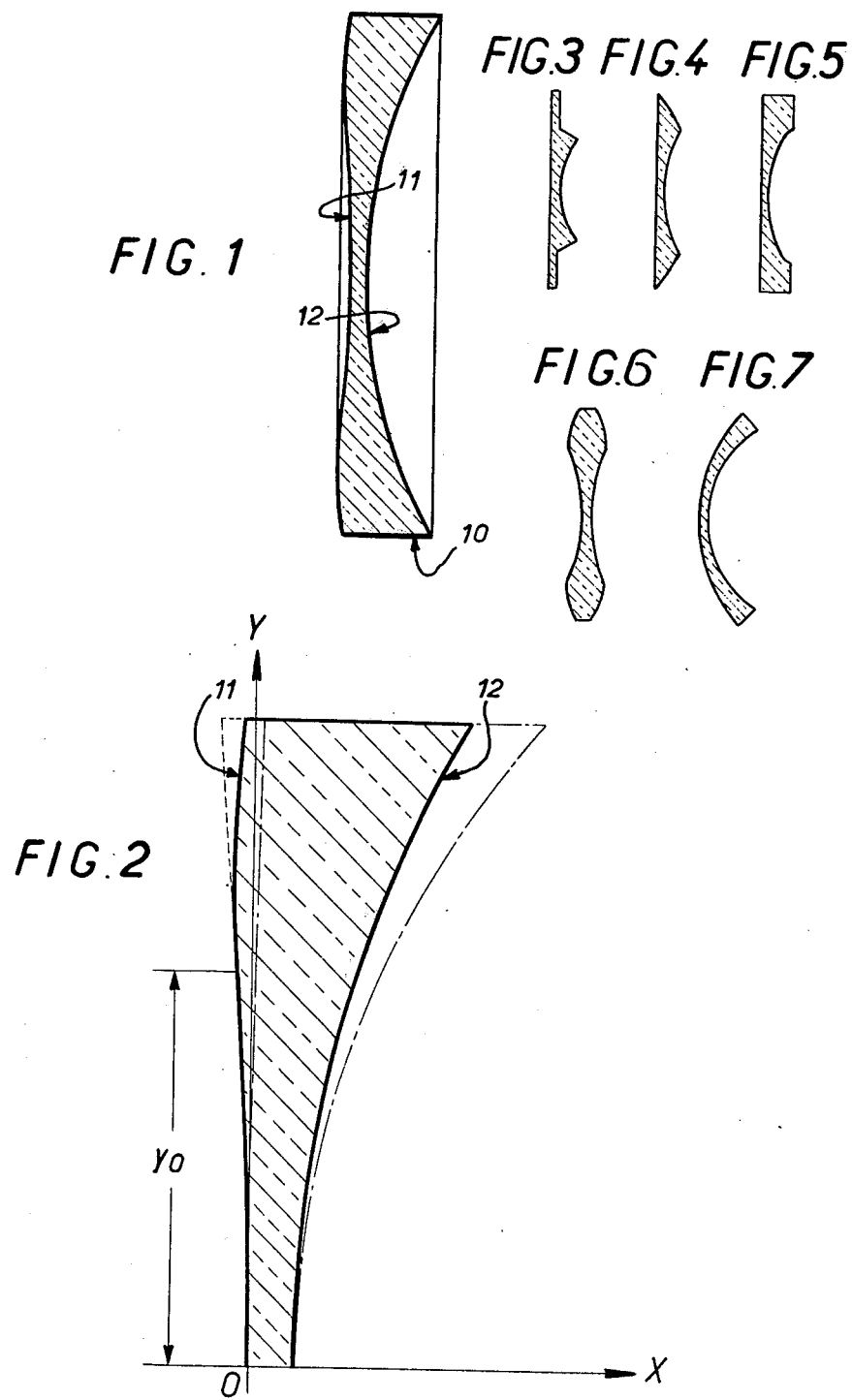

OPHTHALMIC LENS HAVING AN ASPHERIC SURFACE

BACKGROUND OF THE INVENTION

The present invention relates to ophthalmic lenses, for example, to ophthalmic lenses for short-sightedness, the power of which is between −5 and −20 dioptres.

As is known, the power of a lens is defined in general terms by the curvature given to its front and/or back faces, the front face being conventionally designated as that face which is furthest from the eye to be corrected, and the back face being conventionally designated as that face which is closest to this eye. In practice, the power of an ophthalmic lens is equal to the sum of the powers of its faces within the limits of the thickness correction.

As is also known, such faces are most frequently surfaces of revolution about the optical axis of the lens; for certain corrections, however, one or both of these faces can be toric or cylindrical or can even have a radius of curvature which can vary according to a given particular law.

In general terms, ophthalmic lenses for short-sightedness, having a power of less than −5, belong to one or other of three different types, which are as follows:

Firstly, there are plano-concave lenses, that is to say lenses of which the front face is substantially planar or slightly convex, this front face having only a low power and all the power being provided by the back face of such a lens.

Because of this power contrast, the front and back faces of such a lens rapidly diverge from one another with the result that, at its periphery, this lens possesses a rim of which the thickness, measured axially, that is to say parallel to its axis, is large.

Such a rim has an unfavourable influence on the weight of the lens at the expense of comfort to the user and makes the lens unattractive.

Furthermore, with such a lens, there is a practical limit to the aperture diameter which it is possible to give to the lens for high powers, it being necessary for the back face to have a virtually hemispherical shape as soon as the power is less than −15 dioptres.

In order to reduce the weight of the lens, it is customary to reduce the axial thickness of its peripheral rim outside that which is considered to be the useful zone of such a lens.

For example, an annular surface, which is either planar or convex or formed firstly of a convex part and then of a planar part, is formed outside this useful zone.

In all cases, this results in the formation of angular edges, imparting bull's eye effects to the lens, which is unattractive.

Then there are bi-concave lenses, that is to say lenses of which both the front and back faces are concave and possess substantially the same power.

However, in this case, the aberrations due to each of these faces are cumulative, which is unfavourable; moreover, it is most frequently necessary, as above, to reduce the thickness, and thus the weight, of the peripheral rim of the lens, and this also leads to a bull's eye effect.

Finally, there are concavo-convex lenses, referred to as meniscus lenses, that is to say lenses of which the front face is distinctly convex, whilst at the same time possessing a lower power than that of the back face, the latter being concave; this type of lens is described, in particular, in U.S. Pat. No. 949,501.

Such lenses advantageously possess, at their periphery, a rim of relatively reduced thickness.

Moreover, they have relatively good optical properties, in particular low distortion and acceptable astigmatism.

However, they are unable to make allowances for other defects, in particular the curvature of field.

In fact, it is shown that any action taken on the astigmatism can be to the detriment of the curvature of field.

In other words, an ophthalmic lens can be good from the point of view of the astigmatism and be poor from the point of view of the curvature of field.

It is an object of the present invention to provide an ophthalmic lens which, even when of high power, possesses a peripheral rim having a relatively reduced thickness, whilst at the same time possesses the best possible optical properties, which are at least as good as, or even better than, those of the comparable optical lenses known hitherto.

SUMMARY OF THE INVENTION

According to the present invention there is provided an ophthalmic lens having a front face which is a surface of revolution, wherein, where the optical axis of the lens is taken as the abscissa and the axis which is orthogonal to the optical axis is taken as the ordinate, the curve representing the half-meridian of the front face of the lens corresponds to a formula of the type:

$$x = ay^2 + by^\alpha + cy^\gamma$$

in which the coefficient a is different from zero and negative, at least one of the coefficients b and c is different from zero and positive, $\alpha$ is a real number which is greater than or equal to 3 and less than 4, and $\gamma$ is a real number which is greater than or equal to 4.

Thus, with a lens of the invention, it is the front face which is aspherical, it being possible for the back face of this lens to be, for example, spherical or toric, if desired.

Calculations show and experiments have confirmed that unpredictably, the use, for the front face of an ophthalmic lens, of a surface of which the curve representing the half-meridian corresponds to the general formula given above, which formula is at least of the third order in practice, leads to a considerable reduction in the weight of such a lens and to the production of excellent optical characteristics as compared to known lenses.

For example, the curve representing the half-meridian of the front face of the ophthalmic lens according to the invention can correspond to the general formula:

$$x = ay^2 + by^3 + cy^4 + dy^5 \qquad (I)$$

in which the coefficients c and d can be zero.

Preferably, but not necessarily, if it is desired to reduce the axial thickness of the peripheral rim of the lens in order to provide a complementary reduction in the weight of the latter, the curve representing the meridian of the front face of this lens then corresponds to the general formula:

$$x = ay^2 + by^3 + cy^4 + dy^5 + e(y - y_0) \qquad (II)$$

in which: e equals zero when y is less than $y_o$, and e is greater than zero when y is greater than $y_o$, whether e be a constant or a function of $(y-y_o)$, and in which $y_o$ is equal to half the practical aperture diameter of the lens, that is to say half the diameter of its useful zone.

Under these conditions, the reduction in weight can reach 20 to 30%, in relation to a plano-concave lens of the comparable customary type.

However, in all cases, the astigmatism is reduced and the same applies to the curvature of field and also to the distortion and to the power defect, which, in practice, remains below the customary factory limits.

Moreover, any bull's eye effect is avoided.

BRIEF DESCRIPTION OF THE DRAWINGS

Embodiments of the present invention will hereinafter be described, by way of example, with reference to the accompanying drawings, in which:

FIG. 1 shows an axial section of an ophthalmic lens according to the invention;

FIG. 2 shows on a larger scale one half of the axial section of this lens, and

FIGS. 3 to 7 are views analogous to that of FIG. 1, on a reduced scale, and illustrate the prior art.

DESCRIPTION OF THE PREFERRED EMBODIMENTS

The figures illustrate, by way of example, the application of the invention to the production of an ophthalmic lens of negative power, of the type required for the correction of myopia.

Customarily, before the routing of a lens to match its contour to that of the spectacle frame which it is to equip, such a lens is in the form of a disc which has a cylindrical peripheral contour 10 and which is axially delimited by two transverse dioptres, one of which forms the front face 11 of the lens and the other of which forms the back face 12. The front face 11 is, by convention, that which is furthest from the eye to be corrected, whilst the back face 12 is that which is closest to this eye.

Such an ophthalmic lens can be made of mineral glass, but, in order to obtain a minimum weight, it is preferably made of organic material.

In a manner which is in itself known, the front face 11 and the back face 12 of the lens according to the invention are surfaces of revolution about the optical axis of the lens, which axis is chosen as the abscissa X in FIG. 2; the axis Y, which, lying in the plane of this figure, is orthogonal to the axis X, is taken as the ordinate.

According to the invention, the curve representing the half-meridian of the front face 11 corresponds to a formula of the type $$x = ay^2 + by^\alpha + cy^\gamma$$

in which the coefficient a is different from zero and negative, at least one of the coefficients b and c is different from zero and positive, $\alpha$ is a real number which is greater than or equal to 3 and less than 4, and $\gamma$ is a real number which is greater than or equal to 4.

According to a preferred embodiment, the curve corresponds to the following general formula, the exponents $\alpha$ and $\gamma$ being integers:

$$x + ay^2 + by^3 + cy^4 + dy^5 \qquad (I)$$

in which formula, in combination with the above conditions, c and d can be zero.

This curve is thus at least of the third order and may be of the fifth order.

In practice, the coefficients a, b, c and d are all different from zero, at least one of the coefficients b, c and d having a different sign from the sign of the coefficient a, and hence being positive.

Depending on the overall power which is to be obtained for the lens, and on the distribution of chosen powers between the front and back faces of this lens, these coefficients are determined by an iterative calculation, the purpose of which is to obtain optimum optical characteristics for such a lens.

Preferably, in order to reduce the thickness of the peripheral rim of the lens, the curve representing the half-meridian of the front face of the latter corresponds, according to the invention, to the general formula;

$$x = ay^2 + by^3 + cy^4 + dy^5 + e(y-y_o) \qquad (II)$$

in which:

e equals zero when y is less than $y_o$, e is greater than zero when y is greater than $y_o$, and in which $y_o$ is equal to half the practical aperture diameter of the lens, that is to say half the diameter of its useful zone.

The coefficient e can be a constant; it can also be a function of $(y-y_o)$, for example of the type $(y-y_o)^n$.

FIG. 2 illustrates in detail, by way of example, the case of an ophthalmic lens having an overall power equal to $-12$, which is divided up as follows: $-3$ for the front face 11, and $-9$ for the back face 12.

According to one application of the invention, the front face of this lens is a surface of the fifth order, the half-meridian of which corresponds to one or other of the general formulae I and II specified above, in which:

$$a = -3 \times 10^{-3}$$

$$b = -702 \times 10^{-8}$$

$$c = 295 \times 10^{-8}$$

$$d = -5 \times 10^{-8}$$

Conjointly, the back face 12 of this lens is a spherical surface.

FIG. 2 shows, in solid lines, the contour of the lens according to the invention, in the case where its front face obeys the formula II specified above, and shows, in dotted lines, the said contour in the case where this front face obeys the formula I also specified above.

These two contours diverge from one another at the ordinate $y_o$ which corresponds to the useful diameter of the lens, which diameter is chosen for example, to be equal to 30 mm.

Each of the two contours possesses a point of inflection, which is due to the value of the coefficients and to their signs, and which is more pronounced for the first contour than for the second.

The total diameter of the lens is of no consequence; for example, it can be equal to 55 or 56 mm, which is the customary diameter.

It is also customary for the thickness at the centre of the lens to be equal to 2 mm in the case of a lens made of organic material; this thickness can be lower, for example of the order of 1.2 mm, in the case of a lens made of mineral glass.

FIG. 2 also shows, in dot-and-dash lines, the contour of a plano-concave lens of the customary type having the same power characteristics and the same thickness at the centre as the lenses of the invention.

As is clearly illustrated in FIG. 2, the lenses according to the present invention each possess, at the periphery, a smaller axial thickness than that of the plano-concave lens of the customary type which has comparable characteristics to the lenses of the invention; this results, in particular, in the lenses according to the invention being lighter than the said plano-concave lens.

For the numerical conditions specified above, the plano-concave lens of the customary type has a weight of about 25.6 g in the case of a "CR 39" lens, that is to say, a lens made of poly-(diallyl glycol carbonate).

For a lens according to the invention in the case where the front face corresponds to the formula I, this weight is reduced to 20.02 g under the same conditions; in the case where the front face of the lens corresponds to the formula II, this weight is reduced to 18.7 g.

The reduction in weight is therefore of the order of 20 to 30%.

Conjointly, the reduction in thickness at the peripheral rim of the lens is of the order of 20% in the case of the formula II above.

As a corollary, the optical properties of the lens according to the invention are excellent.

This is illustrated by Table I below.

This table shows, as a function of particular values of half-apertures O, given in degrees, the corresponding values of the astigmatism A, expressed in dioptres, of the power defect P, also expressed in dioptres, of the distortion D, expressed in %, and of the tangential focal length T and the sagittal focal length S, both expressed in dioptres, it being assumed that the distance between the eye to be corrected and the lens is equal to 27 mm.

TABLE I

| O | A | P | D | T | S |
|---|---|---|---|---|---|
| 0 | −0.000 | 0.000 | 0.754 | −11.988 | −11.988 |
| 2.5 | −0.008 | 0.012 | 0.654 | −12.006 | −11.998 |
| 5 | −0.013 | 0.016 | 0.397 | −12.018 | −12.006 |
| 7.5 | −0.014 | 0.014 | −0.026 | −12.026 | −12.012 |
| 10 | −0.016 | 0.007 | −0.625 | −12.034 | −12.018 |
| 12.5 | −0.017 | −0.002 | −1.415 | −12.042 | −12.025 |
| 15 | −0.020 | −0.013 | −2.418 | −12.054 | −12.034 |
| 17.5 | −0.025 | −0.024 | −3.662 | −12.071 | −12.046 |
| 20 | −0.031 | −0.031 | −5.181 | −12.094 | −12.063 |
| 22.5 | −0.040 | −0.041 | −7.024 | −12.125 | −12.086 |
| 25 | −0.050 | −0.043 | −9.254 | −12.168 | −12.117 |

It is apparent from this Table I that the astigmatism of the lens according to the invention is substantially less than that of a comparable conventional lens and that the same applies to the distortion and the power defect.

In practice, the same also applies to the curvature of field, which is related to half the sum of the tangential focal length and the sagittal focal length.

Table II below shows, by way of example, the possible values of the coefficients for other types of lenses which possess comparable properties by virtue of the invention.

TABLE II

| focal power | power of back face | a | b | c | d |
|---|---|---|---|---|---|
| −12 | −9 | $-3 \times 10^{-3}$ | $305.2 \times 10^{-7}$ | 0 | 0 |
| −12 | −9 | $-3 \times 10^{-3}$ | $200 \times 10^{-7}$ | $170 \times 10^{-8}$ | 0 |
| −18 | −9 | $-9 \times 10^{-3}$ | $351 \times 10^{-8}$ | $660 \times 10^{-8}$ | $-7 \times 10^{-8}$ |
| −18 | −12 | $-6 \times 10^{-3}$ | $890 \times 10^{-8}$ | $280 \times 10^{-8}$ | $2 \times 10^{-8}$ |
| −18 | −15 | $-3 \times 10^{-3}$ | $257 \times 10^{-8}$ | $120 \times 10^{-8}$ | $2 \times 10^{-8}$ |

As above, these coefficients relate to a half-meridian.

The coefficient e can be a constant having, for example, the following values: $k \times 10^{-2}$ or $k \times 10^{-3}$, in which $1 < k < 9$.

e can also be a function of $(y-y_o)$, for example a function of the type $k(y-y_o)^n$.

Of course, the present invention is not restricted to these examples but extends to any variation in the values of these coefficients, which are compatible with the production of the desired properties.

Moreover, the application is not restricted to the case where the back face of the lens is spherical; in particular, if additional weight reduction is desired, the meridian of this back face could be for example, a conical surface, a parabola or a hyperbola, or a surface of the same type as that of the front face.

Furthermore, the invention is not restricted to the case where the front face of the lens is strictly of the third, fourth or fifth order.

On the contrary, this face can be of a higher order.

However, in fact, the advantage which may then be gained as regards the properties of the lens is no longer significant when considering the concomitant complications involved in manufacture.

Moreover, instead of being integers, the exponents $\alpha$ and $\gamma$ in the general formula, given above, of the curve representing the half-meridian of the front face of the ophthalmic lens according to the invention can be fractions.

Whatever the case may be, in the case of a lens obtained by moulding an organic material, the front face of the lens according to the invention is preferably as moulded, whilst its back face is either as moulded, in the case of an overall power determined in advance, or machined according to the overall power to be obtained.

Finally, although more specifically intended for the case of lenses of high negative power, suitable for correcting severe short-sightedness, the invention is not restricted to such an application but can extend to the production of lenses of any power.

In all cases, it will be noted that, since the faces of the ophthalmic lens according to the invention do not possess any angular edges but are, on the contrary, continuous at each of their points, any bull's eye effect is avoided.

In order to provide a better assessment of this advantage in particular, comparable ophthalmic lenses of the prior art have been shown in FIGS. 3 to 7 which are briefly analysed below.

FIGS. 3 to 5 show plano-concave lenses; FIG. 6 shows a bi-concave lens; and FIG. 7 shows a concavo-convex lens.

We claim:

1. An ophthalmic lens having a front face which is a surface of revolution, and wherein with the optical axis of the lens being taken as the abscissa and an axis orthogonal to the optical axis being taken as the ordinate, the curve representing the half-meridian of the front face of the lens corresponds to the formula:

$$x = ay^2 + by^3 + cy^4 + dy^5$$

wherein the coefficient a is a number other than zero and negative, the coefficient b is a number other than zero and positive, and coefficients c and d are numbers including zero.

2. An ophthalmic lens according to claim 1, wherein all of said coefficients a, b, c and d are numbers other than zero, and at least one of said coefficients c and d are being positive.

3. An ophthalmic lens having a front face which is a surface of revolution, and wherein with the optical axis of the lens being taken as the abscissa and an axis orthogonal to the optical axis being taken as the ordinate, the curve representing the half-meridian of the front face of the lens corresponds to the formula:

$$x = ay^2 + by^3 + cy^4 + dy^5 + e(y-y_o)$$

wherein the coefficient a is a number other than zero and negative, the coefficient b is a number other than zero and positive, coefficients c and d are numbers including zero, and the coefficient e equals zero when y is less than $y_o$ and is greater than zero when y is greater than $y_o$, and $y_o$ is equal to half the practical aperture diameter of the lens.

4. An ophthalmic lens according to claim 3, wherein said coefficient e is a constant.

5. An ophthalmic lens according to claim 3, wherein said coefficient e is a function of $(y-y_o)$.

* * * * *